United States Patent

Finkler et al.

(10) Patent No.: US 10,353,821 B2
(45) Date of Patent: Jul. 16, 2019

(54) SYSTEM, METHOD, AND RECORDING MEDIUM FOR COMMON MEMORY PROGRAMMING

(71) Applicant: International Business Machines Corporation, Armonk, NY (US)

(72) Inventors: Ulrich Alfons Finkler, Mahopac, NY (US); Hubertus Franke, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 422 days.

(21) Appl. No.: 15/189,132

(22) Filed: Jun. 22, 2016

(65) Prior Publication Data

US 2017/0371798 A1    Dec. 28, 2017

(51) Int. Cl.
*G06F 12/08* (2016.01)
*G06F 12/0888* (2016.01)
*G06F 12/0804* (2016.01)
*G06F 12/1009* (2016.01)
*G06F 12/109* (2016.01)

(52) U.S. Cl.
CPC ...... *G06F 12/0888* (2013.01); *G06F 12/0804* (2013.01); *G06F 12/1009* (2013.01); *G06F 12/109* (2013.01); *G06F 2212/6042* (2013.01); *G06F 2212/657* (2013.01)

(58) Field of Classification Search
None
See application file for complete search history.

(56) References Cited

U.S. PATENT DOCUMENTS

| 5,864,866 | A | * | 1/1999 | Henckel | G06F 17/30607 |
| 6,020,886 | A | * | 2/2000 | Jacober | G06F 9/453 |
| | | | | | 715/709 |
| 8,438,341 | B2 | | 5/2013 | Finkler et al. | |
| 2006/0288034 | A1 | * | 12/2006 | Do | G06F 21/57 |
| 2009/0217308 | A1 | * | 8/2009 | Bostick | G06F 9/44505 |
| | | | | | 719/328 |
| 2011/0307677 | A1 | * | 12/2011 | David | G06F 9/5016 |
| | | | | | 711/163 |
| 2012/0124108 | A1 | * | 5/2012 | Kandasamy | G06F 17/30233 |
| | | | | | 707/822 |
| 2012/0162708 | A1 | * | 6/2012 | Hagiwara | G06F 3/1204 |
| | | | | | 358/1.15 |

(Continued)

OTHER PUBLICATIONS

Krueger, et al. "Tools for the Development of Application-Specific Virtual Memory Management". OOPSLA 1993 Proceedings of the eighth annual conference on Object-oriented programming systems, languages, and applications. pp. 48-64.

*Primary Examiner* — Tuan C Dao
(74) *Attorney, Agent, or Firm* — Jennifer R. Davis, Esq.; McGinn IP Law Group, PLLC

(57) ABSTRACT

A parallel execution method, system, and non-transitory computer readable medium not maintaining a cache coherence, include creating a continuum, the continuum being a construct that holds data structures, giving a view to the continuum, the view being a descriptor that provides access rights and properties for the continuum, and performing a task associated with an execution sequence, the task holding the view to the continuum that the execution sequence is accessing.

19 Claims, 6 Drawing Sheets

(56) References Cited

U.S. PATENT DOCUMENTS

| | | | |
|---|---|---|---|
| 2012/0210265 A1* | 8/2012 | Delia | G06F 8/34 |
| | | | 715/771 |
| 2012/0239871 A1* | 9/2012 | Badam | G06F 12/0246 |
| | | | 711/104 |
| 2012/0303874 A1* | 11/2012 | Yamaguchi | G06F 9/4401 |
| | | | 711/103 |
| 2013/0086328 A1* | 4/2013 | Frank | G06F 12/0875 |
| | | | 711/125 |
| 2014/0281243 A1* | 9/2014 | Shalf | G06F 12/0813 |
| | | | 711/122 |
| 2015/0106567 A1* | 4/2015 | Godard | G06F 9/3828 |
| | | | 711/121 |
| 2017/0206035 A1* | 7/2017 | Kumar | G06F 3/061 |

* cited by examiner

SYSTEM, METHOD, AND RECORDING MEDIUM FOR COMMON MEMORY PROGRAMMING

CROSS-REFERENCE TO RELATED APPLICATIONS

This application is related to U.S. Pat. No. 8,438,341, filed on Jun. 16, 2010 and issued May 7, 2013, the entire contents of which are incorporated herein by reference.

BACKGROUND

The present invention relates generally to parallel programming techniques, and more particularly, but not by way of limitation, to a system and method for programming a cluster similarly to a large shared memory system which employs a parallel programming model that does not require coherence.

Conventionally, parallel programming paradigms are partitioned into two classes, shared memory and message passing. In shared memory paradigms, the individual execution sequences, usually called "threads", semantically all operate on the same 'memory'. In message passing paradigms, the individual execution sequences, usually called "processes", operate on separate 'memories'. The two classes of paradigms have different advantages and disadvantages.

Maintaining coherence is a challenge for shared memory systems with many processors, and even more so in a cluster of distributed systems. The message passing paradigm does not require coherence, but at the price of higher cost of data exchange. Data structures have to be serialized and de-serialized in order to be exchanged between processes. Furthermore, a data exchange between processes in different compute nodes requires a copy.

Synchronization errors as, for example, race conditions and deadlocks are often hard to find in shared memory applications. Message passing paradigms avoid race conditions, but data structures have to be partitioned such that each part fits into the memory of a single compute node.

SUMMARY

In view of the above technical problems with the conventional techniques, the inventors have considered a non-abstract improvement to a computer technology via a technical solution to the technical problem in which a system can exploit a semantic gap discovered to exist in shared memory paradigms between the implementation and the programs intent to provide a parallel programming paradigm that provides a number of highly desirable properties such as a unified view of the memory across all compute nodes with support for pointer-based data structures without requiring coherence, being free of race conditions and deadlocks by construction, and allowing extensive error recovery in case of compute node failure.

In an exemplary embodiment, the present invention can provide a parallel execution method not maintaining a cache coherence, the method including creating a continuum, the continuum being a construct that holds data structures, giving a view to the continuum, the view being a descriptor that provides access rights and properties for the continuum, and performing a task associated with an execution sequence, the task holding views to the continua that the execution sequence is accessing.

Further, in another exemplary embodiment, the present invention can provide a parallel execution system not maintaining a cache coherence, the system including a processor, and a memory, the memory storing instructions to cause the processor to: create a continuum, the continuum being a construct that holds data structures, give a view to the continuum, the view being a descriptor that provides access rights and properties for the continuum, and perform a task associated with an execution sequence, the task holding views to the continua that the execution sequence is accessing.

Even further, in another exemplary embodiment, the present invention can provide a non-transitory computer-readable recording medium recording a parallel execution program not maintaining a cache coherence, the program causing a computer to perform: creating a continuum, the continuum being a construct that holds data structures, giving a view to the continuum, the view being a descriptor that provides access rights and properties for the continuum, and performing a task associated with an execution sequence, the task holding views to the continua that the execution sequence is accessing.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

Figure 1:
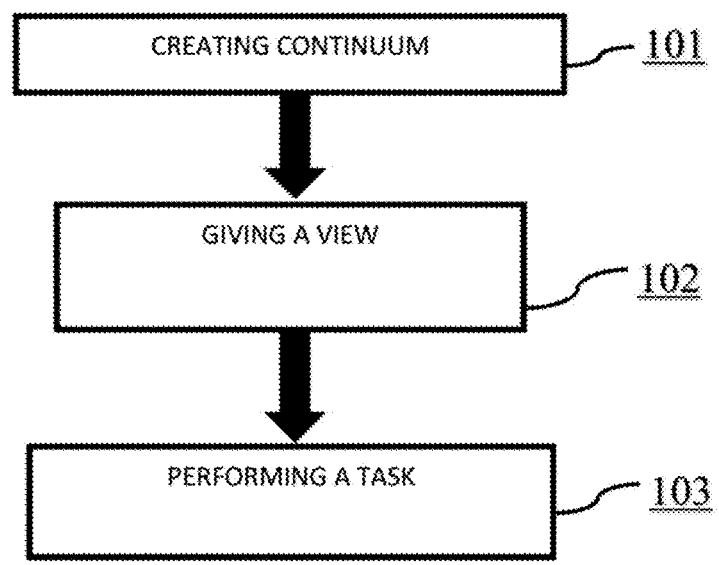
FIG. 1 exemplarily shows a high level flow chart for a parallel execution method 100.

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

With reference now to FIG. 1, the parallel execution method 100 includes various steps to takes advantage of the semantic 'gap' between the shared memory paradigms and programmer intent. A parallel program executed by the parallel execution method 100 is intended to execute multiple execution sequences concurrently. In order to be suitable for concurrent execution, an execution sequence has to be independent of all other execution sequences that may execute at the same time. That is, the parallel execution method 100 is required to exchange the access to data structures to ensure independence. Often the data structures are spread over multiple memory locations, as for example lists of strings or graphs or even more complex combinations of data structures. The use of representors as mutices and atomic variables does not precisely match the required semantics. The use of representors or dynamically determined scopes in shared memory paradigms does not provide the underlying system with sufficient knowledge of the scope of an exchange and thus the system has to ensure coherence for the entire view of an execution sequence. Thus, the parallel execution method 100 not relying on representors can close this semantic gap.

The semantics of the shared memory Application Program Interfaces (APIs) do not provide enough information to the underlying system about this directional and selective character of the exchange, and thus the system has to provide coherence between all views, not only those involved in the exchange. Semantics of the parallel execution method 100 that capture this information in a form usable to the underlying system can close this semantic gap.

Further, message passing paradigms capture both the selective and directional character of access exchanges and the scope of the exchange. But the exchange of access to a data structure, for example a dictionary, has to perform a copy involving serialization and deserialization. Furthermore, a canonical labeling or ordering beyond the local address of data elements is required. For process "A" to reference the node of a graph residing with process "B", the two processes have to use a common scheme to identify nodes, as for example a numbering established by the application. If the graph is represented through dynamic structures as linked lists, this introduces a level of indirection. The parallel execution method 100 allows remote references through addresses which can close this semantic gap.

Figure 2:
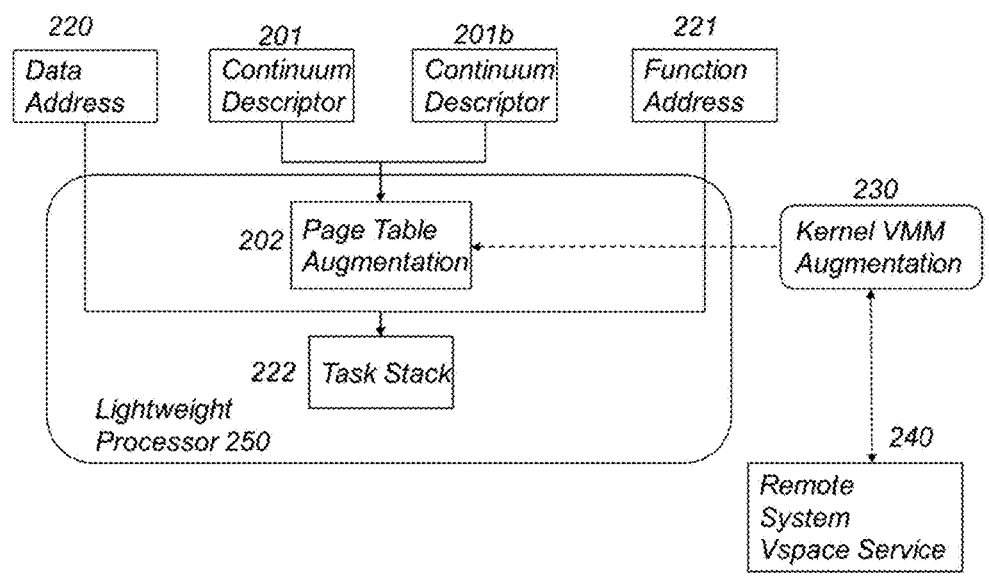
FIG. 2 exemplarily shows a high level flow chart for the parallel execution method 100 on a light weight processor (LWP) 250.
Figure 5:
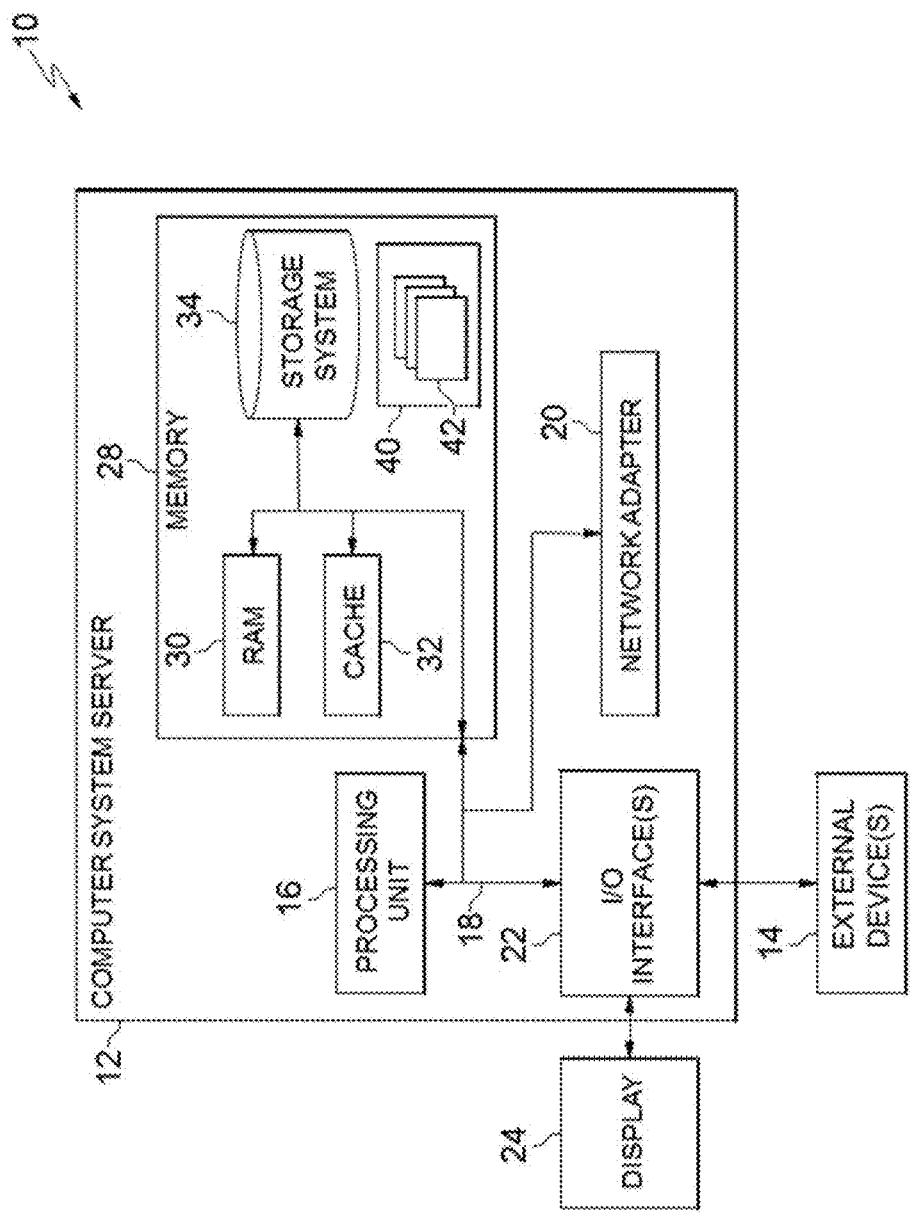
FIG. 5 depicts a cloud computing node 10 according to an exemplary embodiment of the present invention.

As shown in at least FIG. 5, one or more computers of a computer system 12 can include a memory 28 having instructions stored in a storage system to perform the steps of FIGS. 1 and 2.

Figure 6:
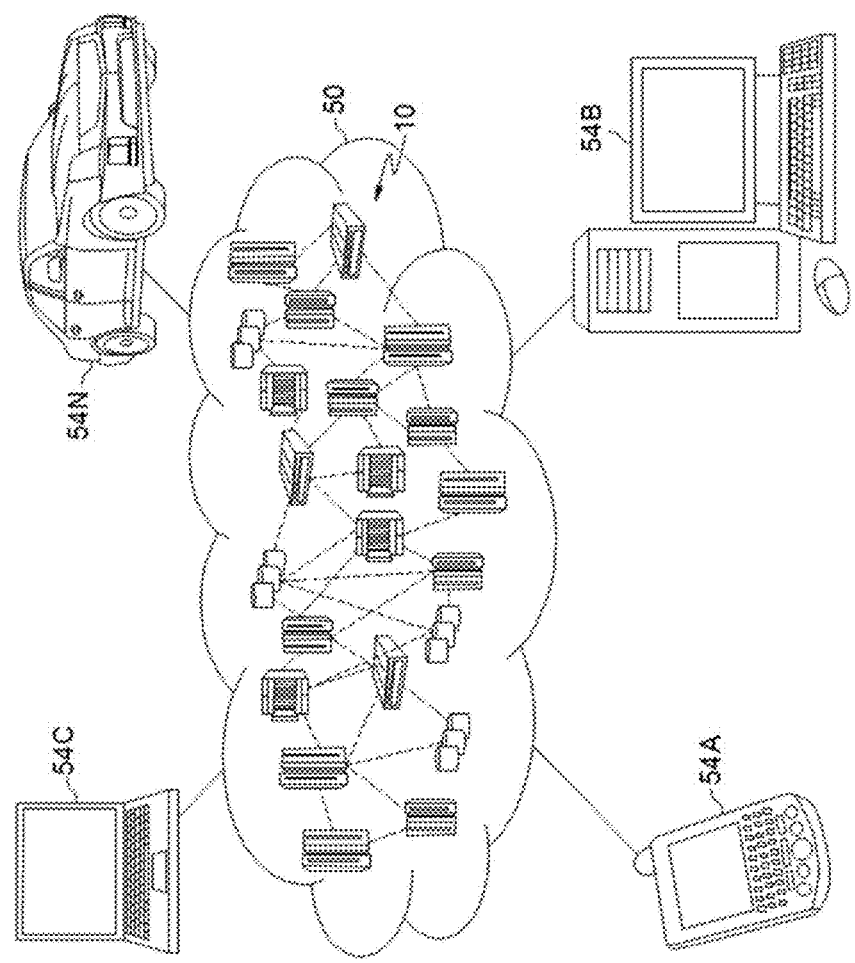
FIG. 6 depicts a cloud computing environment 50 according to another exemplary embodiment of the present invention.
Figure 7:
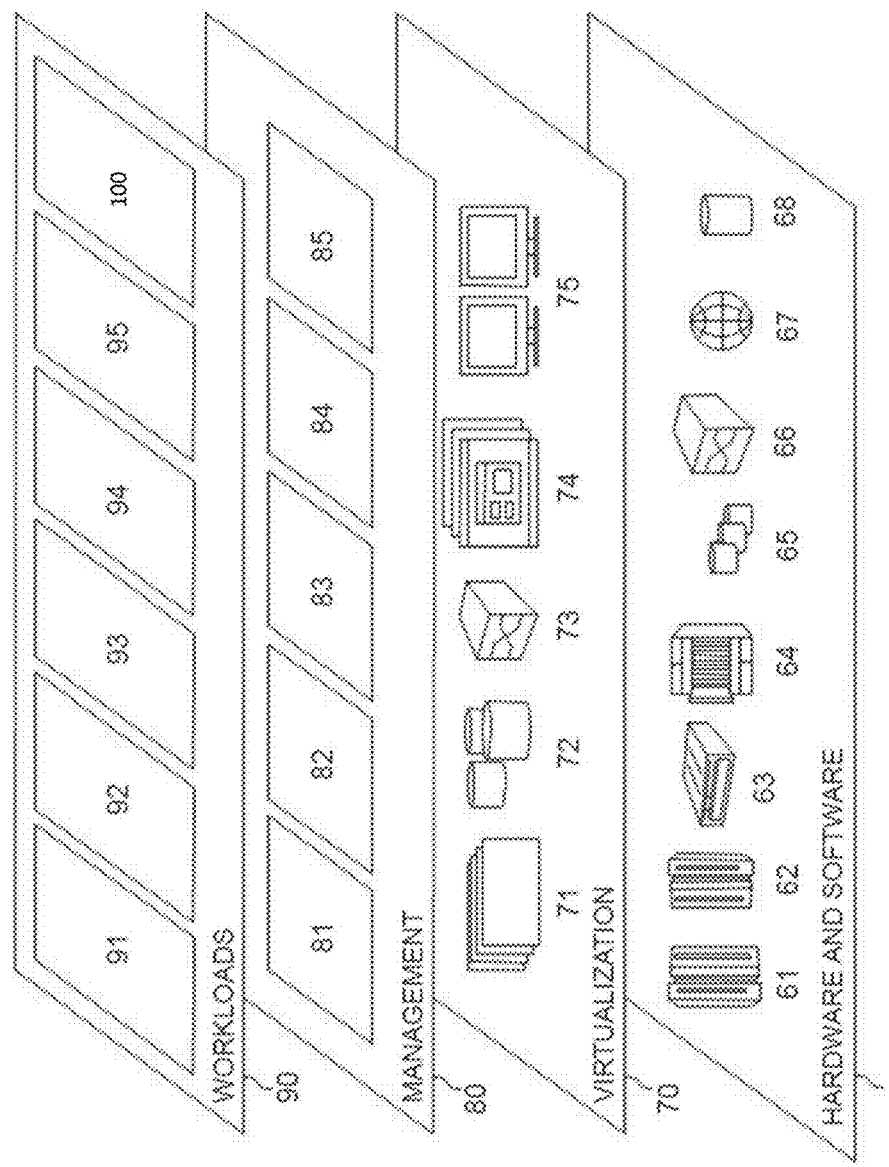
FIG. 7 depicts abstraction model layers according to an exemplary embodiment of the present invention.

Although as shown in FIGS. 5-7 and as described later, the computer system/server 12 is exemplarily shown in cloud computing node 10 as a general-purpose computing circuit which may execute in a layer the parallel execution system 100 (FIG. 7), it is noted that the present invention can be implemented outside of the cloud environment.

Step 101 creates a continuum. A continuum is a construct that holds data structures. There are three basic types of continua including, a static continuum, a persistent continuum, and dynamic continuum. A static continuum is a continuum that cannot be altered after it is populated with data, a persistent continuum is a continuum that is not automatically released when the owning task terminates, and a dynamic continuum is a continuum that is associated with a task which can be modified, but that does not have to persist independent of tasks (as described later).

A continuum can use as much memory as available across all compute nodes combined. The size of a continuum does not have to be specified at construction, as it grows dynamically. Also, continua enable redirection of memory allocation/deallocation within marked code sections into virtual addresses associated with a continuum.

Step 102 gives a view to a continuum. A view is a descriptor that provides access rights and properties of a continuum. A view can provide exclusive, read-only or scratch-space type of access rights to a continuum. The descriptor also provides access to the virtual address ranges and physical memory associated with the continuum.

Step 103 performs a task(s) associated with an execution sequence. Tasks can recursively create other tasks. A task is defined through the address of a function f (e.g., "void*f (void*)"). Performing a task causes its execution to be scheduled in the background. A task holds appropriate views to all continua that contain data that the execution sequence wants to access.

A task holding the exclusive view to a continuum may read, modify and release the continuum. A task holding a read-only view to a continuum may only read the content of the continuum. A task holding a specific view to a continuum may read and modify with copy-on-write semantics. Specific views provide a task with a "scratch space". The scratch space with the best behavior with respect to some metric can be chosen as the sole survivor.

A static continuum can only be modified during its preparation. Once the static continuum is finalized, it can only be read and released. A persistent continuum can be modified and is always associated with at most one task that holds an exclusive view.

When the task is performed by Step 103, the allowed transitions on the set of views of a dynamic continuum provide the backbone for the interaction between tasks.

A task can create a continuum and it receives one exclusive view to the continuum. The task holding the exclusive view to a continuum can persist the continuum. There can be only one exclusive view to a continuum. The holder of the exclusive view can modify the content of the continuum. The task holding the exclusive view can change the state of its view to read-only, thereby losing the right to modify the continuum. A task can give read-only views to other tasks and retain its own read-only view. This creates additional views to the continuum. A task can change a read-only view into a specific view. The task can now modify the view, but the modifications only affect this specific view to the continuum (copy-on-write semantics). A task can release the view to a read-only or specific continuum. If all views to a continuum are released without deleting the continuum, the continuum and the resources it uses have 'leaked'. A task can turn a read-only or specific view into an exclusive view only if it holds the last view to the continuum. A task can release a continuum only if it holds the exclusive view.

Figure 3:
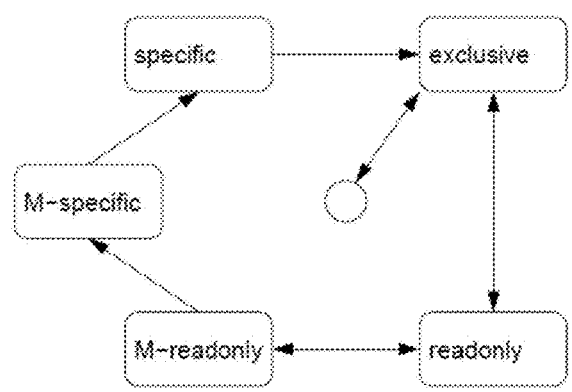
FIG. 3 exemplarily shows possible states of a continuum and transitions.

For example, FIG. 3 exemplarily shows possible states of a continuum and transitions with the 'M' prefix indicating the existence of multiple access permission tokens. Permitted state transformations of continua are allowed without memory coherence.

FIG. 2 depicts an exemplary management of a virtual address space ("Vspace") as an explicit resource across a cluster using the parallel execution method 100. It is noted that current x86_64 Linux versions support $2^{47}$ bytes of virtual address space, and $2^{63}$ bytes are possible.

The continuum created by Step 101 is a subset of the Vspace, realized as a collection of continuous sections of Vspace. The Vspace of a continuum is initially not backed by physical memory. The Vspace subsets covered by any two different continua are disjoint.

Figure 4:
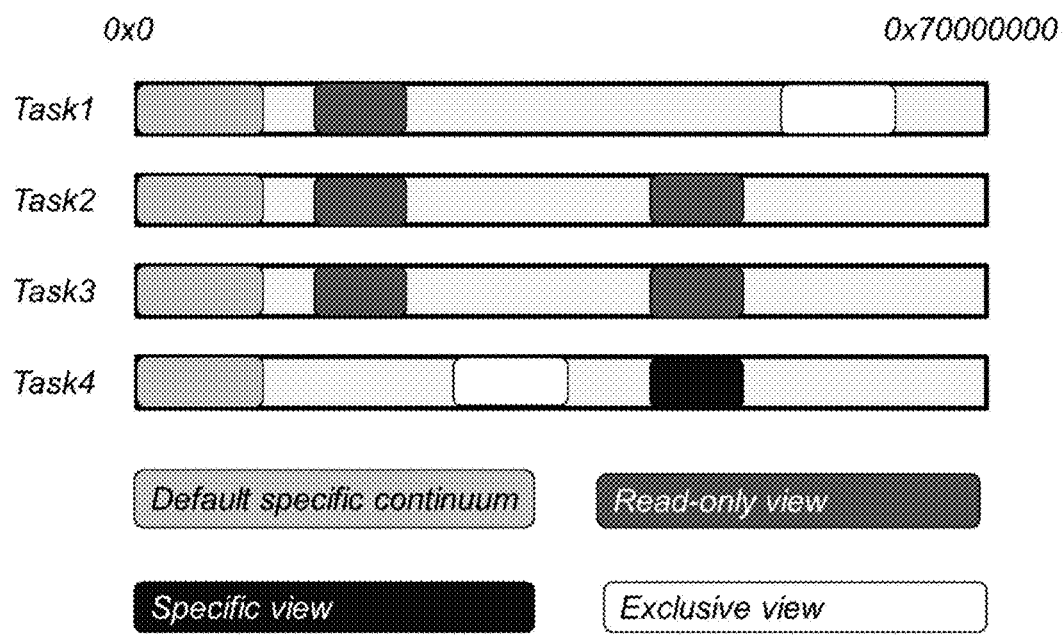
FIG. 4 exemplarily shows a Vspace layout.

The default continuum covers the same region of Vspace in each task (e.g., as shown in FIG. 4), typically at the low address range and with enough Vspace to cover the RAM and paging space of the largest compute node.

There are different options to implement Vspace management, which is analogous to a malloc subsystem. The Vspace management may be distributed evenly across the nodes in the cluster. A formula: h=B+S/n*p can be used to map a virtual address to its managing host where "h" is the host index, "n" the number of hosts, "p" the virtual address, and "B" and "s" are the start address and size of the Vspace used for the continua, respectively.

Each node runs a service that allows reservation and release of Vspace sections from the part of Vspace that it manages. A task typically obtains Vspace from the node it runs on. If this fails, the services of other compute nodes are accessed. This distributes the workload of the Vspace management.

The creation of a continuum by Step 101 reserves a section of Vspace 201 that is not backed by physical memory. Physical backing of pages is added as Vspace is accessed. The release of a continuum returns the Vspace sections to the service on the node from which it was obtained. Note that no central directory is necessary to manage Vspace since the address ranges covered by different compute nodes are disjoint.

Dynamic growth of a continuum is handled by using increasingly-sized sections of Vspace so that the total number of sections in a continuum is O(log(S)), with S being the size of the continuum.

When a continuum is created, the data structures for a malloc subsystem are created in its first Vspace section. The selection of a continuum redirects memory management to use the allocator of the continuum. The allocator increases the 'break' in the Vspace section until it is used up, and then adds another section.

Vspace sections are collected into a linked list. Physical memory is mapped into the Vspace as pages are accessed by the application. Deallocation causes memory to be returned to the allocator it was obtained from. Note that a task must have exclusive access permissions to a continuum that it modifies, which includes destruction of data structures.

The paging mechanism of the operating system may be used to facilitate continua that reside on a remote node or that are larger than the memory of a single compute node. Rather than paging to disk, the page or Vspace section is moved to a different compute node. Hence, continua may be distributed with the granularity of a page across multiple compute nodes.

The set of page locations is part of the definition of a continuum. Page location information depends on the implementation. It may be only a compute node index which is used in combination with the virtual address of the page. Alternatively, the physical address of the page on the holding compute node may be available. At the start of each Vspace section resides the paging information for the section, behind the link to the next section.

The implementation of a view adds a descriptor for the continuum (e.g., the continuum descriptor 201). The descriptor holds the access permission, start address and paging information for the first page of the first section of the continuum.

The continuum descriptor 201 may cache more information about the continuum, e.g. for each Vspace section it may cache the virtual start address and the size as well as some paging information for the section. Everything else is retrieved only if accessed. Thus, the transmission of a view requires only O(log(S)) bytes of data, even with paging information for the first pages of all sections only O(log(S)) bytes of data. S is the size of the Vspace in the continuum. For example, a continuum of 1 Terabyte in size can be covered with a descriptor of less than 512 bytes, but only 32 bytes for a minimal descriptor.

When a task (e.g., performing a task 103) receives a view (e.g., the page table augmentation 202), the Vspace sections that are not already local are mapped such that they trigger a page fault. The paging information is set such that a remote fetch is triggered with access to the view descriptor structure. Initially, this structure is only minimally populated for each Vspace section with the information of the transmitted descriptor. As page faults occur, more and more of the paging information from the start of the sections and actual pages are imported from the remote system (e.g., the kernel Virtual Memory Management (VMM) augmentation 230 and the remote system Vspace Service 240).

Further, an access to a virtual address in a continuum that does not cause a page fault is handled like any other memory access. An access to a virtual address in a continuum that causes a page fault retrieves the location of the page if not already available and then the page from the remote system 240, effectively caching it.

That is, the access permissions to the continuum allow the system to make all relevant decisions with respect to caching locally when the page table augmentation 202 is started.

For read-only access (e.g., read-only view as shown in FIG. 4), the page is known to be valid and can be cached locally as long as the access permission is held. The original remains in its place. For exclusive access (e.g., exclusive view as shown in FIG. 4), the local page becomes the only copy and the remote page is released once the cached page is modified. For specific access (e.g., specific view as shown in FIG. 4), the local page becomes the only copy for this specific instance of the continuum once it is modified and the remote page remains in place.

Pages are evicted if capacity constraints are encountered. The RAM of the node that executes the task acts like a regular cache for the continuum, using pages rather than cache lines. The access permission to the continuum determines the eviction policy. Content of read-only continua may be discarded, since the original version is still available. Content of exclusive and specific continua has to be moved to another compute node (e.g., the Kernal Virtual Memory Management (VMM) Augmentation 230).

Multiple tasks residing on the same compute node with read-only views to the same continua may share information that is present on the same compute node. If a page is already present, it is sufficient to map this page into the virtual address space of the task that caused the page fault.

Static continua are a common special case of this scenario for data that are used by many tasks and are not changed after initialization. Explicit declaration of such a continuum allows the system to pre-distribute and pre-map views to these continua to reduce the number of page faults.

When a task is started via the task stack 222, its initial views are known to the system (e.g., the data address 220 and the function address 221). This provides information to optimize the location of tasks. The processes that implement tasks can be placed close to the majority of the data in the continua to which they have access.

Persistent continua provide additional information to the scheduler for the common case of repeated modification of the same data set, for example in an iterative environment. Persistent continua benefit more from high locality, i.e. residing on a single compute node, than other types of continua. Additionally, the scheduler can co-locate processes with the exclusive view to a persistent continuum on the compute node that holds the data.

It is noted that each continuum contains its own specific memory allocation subsystem. This offers opportunities to choose different allocation subsystems and cleanup strategies for different purposes. This increases execution efficiency and memory locality and reduces memory footprint in many programming patterns.

Also, continua-specific information as extensions to page table entries is encoded such that the task stack 222 receiving the data address 220 and the function address 221 is sufficient to resolve remote fetch of a page in a continuum.

A use pattern is the use of temporary continua created to transfer information to a task or to retrieve information from a task. For example, the continua that transfer sentences to a task and return dependency trees from a task fall into this category. The data structures are built, used for some time without modification and then destructed. The static continuum for the language model is another example for this usage pattern.

For this type of usage pattern, the entire continuum can be released without data structure-specific destruction. The parallel exaction method 100 does not have to deallocate the words and sentences individually. Furthermore, a minimal allocator that simply cuts the continuous space of a section is sufficient since no reuse of deallocated memory occurs. Allocated memory blocks are perfectly sized to the demand and no overhead for coalescing or indexing is required. The memory overhead and the number of operations spent in memory allocation and deallocation are minimal.

Although the minimal granularity for the size of the Vspace of a continuum is the size of a page, the amount of data that needs to be transferred for a remote access can be much smaller. Consider a continuum that holds a single 8-byte number. As little as 16 bytes are sufficient to properly initialize the page. The specialized type, size and some status information is packaged into an 8-byte prefix.

A second common pattern is encountered for data structures where all allocations are known to be of the same size or a small number of known sizes. In this case, an allocator with a small number of free lists that exactly match the possible sizes realizes minimal overhead. Here, the prefix is larger. In addition to the 8-byte base prefix, 8-bytes are required for each free list.

Also, large continua that are frequently modified and encountered. The size of the continuum setup data can be significantly larger to allow bucket entries for slab-based memory management and paging information for very large continua sections.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 5, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the parallel execution system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A parallel execution method not maintaining a cache coherence, the method comprising:
    creating a continuum, the continuum being a construct that holds data structures;
    giving a view to the continuum, the view being a descriptor that provides an access right to a virtual address range and a property for the continuum; and
    performing a task associated with an execution sequence, the task holding the view to the continuum that the execution sequence is accessing,
    wherein the view to the continuum includes a unified view across all compute nodes with support for pointer-based data structures without requiring the cache coherence, and
    wherein the continuum enables redirection of memory allocation and deallocation within a marked code section of the virtual address range such that the continuum is released without data structure-specific destruction.

2. The method of claim 1, wherein the continuum comprises a static continuum that comprises a type of continuum which cannot be altered after the static continuum is populated with the data structures.

3. The method of claim 1, wherein the continuum comprises a persistent continuum that comprises a type of continuum which is not automatically released when an owning task of the persistent continuum terminates.

4. The method of claim 1, wherein the continuum comprises a dynamic continuum that comprises a type of continuum which is associated with a type of task that is modifiable.

5. The method of claim 1, wherein a size of the continuum dynamically grows using increasingly sized sections such that a total number of the sized sections in the continuum is controlled by an equation $O(\log(S))$, with S being a size of the continuum.

6. The method of claim 1, wherein a size of the continuum dynamically grows using increasingly sized sections.

7. The method of claim 1, wherein the access right includes at least one of an exclusive right, a read-only right, and a specific right.

8. The method of claim 1, wherein the descriptor further provides access to the virtual address range and a physical memory space associated with the continuum.

9. The method of claim 1, wherein the task recursively creates other tasks.

10. The method of claim 1, wherein the task holding a view having an exclusive view as the access right only reads, modifies, and releases the continuum.

11. The method of claim 10, wherein the task holding e exclusive view to the continuum persists the continuum, and
wherein only one exclusive view to the continuum exists.

12. The method of claim 1, wherein the task holding a view having a read-only view as the access right only reads the continuum.

13. The method of claim 1, wherein the task holding a view having a specific view as the access right only reads and modifies the continuum with a copy-on-write semantic.

14. The method of claim 1, wherein the specific view provides the task with a scratch space.

15. The method of claim 1, wherein the continuum is not initially backed by a physical memory.

16. The method of claim 1, wherein the creating first creates a default continuum that covers a same region in each of a plurality of tasks to be performed by the performing, and
wherein the default continuum is modified based on the execution sequence of the task and the access right of the view associated with the continuum.

17. The method of claim 1, wherein the descriptor of the view further provides a start address and paging information for a first page of a first section of the continuum.

18. A parallel execution system not maintaining a cache coherence, the system comprising:
a processor; and
a memory, the memory storing instructions to cause the processor to:
create a continuum, the continuum being a construct that holds data structures;
give a view to the continuum, the view being a descriptor that provides an access right and a property for the continuum; and
perform a task associated with an execution sequence, the task holding the view to the continuum that the execution sequence is accessing,
wherein the view to the continuum includes a unified view across all compute nodes with support for pointer-based data structures without requiring the cache coherence, and
wherein the continuum enables redirection of memory allocation and deallocation within a marked code section of the virtual address range such that the continuum is released without data structure-specific destruction.

19. A non-transitory computer-readable recording medium recording a parallel execution program not maintaining a cache coherence, the program causing a computer to perform:
creating a continuum, the continuum being a construct that holds data structures;
giving a view to the continuum, the view being a descriptor that provides an access right and a property for the continuum; and
performing a task associated with an execution sequence, the task holding the view to the continuum that the execution sequence is accessing,
wherein the view to the continuum includes a unified view across all compute nodes with support for pointer-based data structures without requiring the cache coherence, and
wherein, the continuum enables redirection of memory allocation and deallocation within a marked code section of the virtual address range such that the continuum is released without data structure-specific destruction.

* * * * *